(12) United States Patent
Nakahama et al.

(10) Patent No.: US 6,784,255 B1
(45) Date of Patent: Aug. 31, 2004

(54) RUBBER COMPOSITION FOR EXTRUSION MOLDING AND FOR MOLDING WITH MOLD AND USE THEREOF

(75) Inventors: Hidenari Nakahama, Chiba (JP); Yuji Ishii, Chiba (JP); Mikio Hosoya, Chiba (JP); Masaaki Kawasaki, Chiba (JP)

(73) Assignees: Mitsui Chemicals Inc., Tokyo (JP); Degussa AG, Dusseldorf (DE)

( * ) Notice: Subject to any disclaimer, the term of this patent is extended or adjusted under 35 U.S.C. 154(b) by 0 days.

(21) Appl. No.: 10/031,635

(22) PCT Filed: Jul. 21, 2000

(86) PCT No.: PCT/JP00/04893

§ 371 (c)(1),
(2), (4) Date: Jun. 3, 2002

(87) PCT Pub. No.: WO01/07516

PCT Pub. Date: Feb. 1, 2001

(30) Foreign Application Priority Data

Jul. 23, 1999 (JP) .............................................. 11-209036
Aug. 6, 1999 (JP) .............................................. 11-223639

(51) Int. Cl.$^7$ .............................................. C08F 136/00
(52) U.S. Cl. ................... 525/331.9; 525/237; 524/262; 524/506; 524/565; 524/571; 524/261; 526/336
(58) Field of Search ........................... 525/331.9, 237; 526/336; 524/261, 506, 262, 571, 565

(56) References Cited

U.S. PATENT DOCUMENTS

| | | | | |
|---|---|---|---|---|
| 3,873,489 A | * | 3/1975 | Thurn et al. ................. | 524/262 |
| 4,229,333 A | | 10/1980 | Wolff et al. ............ | 260/23.7 M |
| 5,349,020 A | * | 9/1994 | Okada et al. ................ | 525/237 |
| 5,387,664 A | * | 2/1995 | Kawasaki et al. .......... | 526/336 |
| 5,489,701 A | | 2/1996 | Childress et al. ........... | 556/427 |
| 6,033,597 A | * | 3/2000 | Yatsuyanagi et al. .. | 252/182.17 |
| 6,521,713 B2 | | 2/2003 | Wolff et al. .............. | 525/331.8 |

FOREIGN PATENT DOCUMENTS

| | | |
|---|---|---|
| EP | 0 803 535 A2 | 10/1997 |
| JP | 5-239289 A | 9/1993 |
| JP | 7-138379 | 5/1995 |
| JP | 7-228588 A | 8/1995 |
| JP | 9-216314 A | 8/1997 |
| JP | 10-7849 A | 1/1998 |
| JP | 10-182885 A | 7/1998 |

* cited by examiner

*Primary Examiner*—David W. Wu
*Assistant Examiner*—Henry S. Hu
(74) *Attorney, Agent, or Firm*—Birch, Stewart, Kolasch & Birch, LLP

(57) ABSTRACT

This invention relates to a rubber composition for extrusion and molding comprising 100 weight parts of ethylene/α-olefin/non-conjugated polyene copolymer (A) composed of ethylene, α-olefin having carbon atoms of 3–20 and non-conjugated polyene, and at least 30–300 weight parts of carbon black (B), and $1.0 \times 10^{-5} - 5.0 \times 10^{-3}$ mol of an alkoxysilane compound shown by the following formula (I):

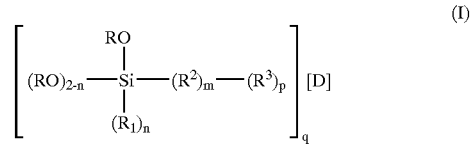

wherein, R is alkyl or alkoxy, $R^1$ is alkyl or phenyl, n is 0, 1 or 2, $R^2$ is a bivalent hydrocarbon, $R^3$ is arylene group, m and p are 0 or 1 respectively, and m and p are not 0 at a same time, q is 1 or 2, and D is —SCN or —SH when q is 1, and —Sx— when q is 2 (wherein x is an integer of 2–8).

19 Claims, 3 Drawing Sheets

RUBBER COMPOSITION FOR EXTRUSION MOLDING AND FOR MOLDING WITH MOLD AND USE THEREOF

This application is the national phase under 35 U.S.C. § 371 of PCT International Application No. PCT/JP00/04893 which has an International filing date of Jul. 21, 2000, which designated the United States of America.

TECHNICAL FIELD

This invention relates to a rubber composition for extrusion and molding and applications thereof.

BACKGROUND ARTS

An ethylene/α-olefin/non-conjugated polyene copolymer rubber such as ethylene/propylene/diene copolymer rubber (EPDM) is widely used for automotive parts, household electric appliance parts, and the like thanks to superior weather ability, heat resistance and ozone resistance.

Among these, materials for sealant or fillers (packing) for automobiles and household electric appliances are the products manufactured by a continuous extrusion molding process.

Requirements for such rubber extrusion composition are continuous feed ability to extruder and no occurrence of crack or tear in a ribbon-like compound preformed prior to an extrusion during its storage.

During extrusion process, cross-sectional area of extrudate should not change, that is, die swell ratio should not vary. Variation in die swell ratio leads to change in cross-sectional shape of glass run or window frame products and may results in lowering of sealing performance and inferior products. Furthermore, in weather strip sponge products, the materials varying in the die swell ratio cause a big problem of uneven foaming since the variation means uneven viscoelastic state in the material.

In addition to these, in extrudate products of EPDM containing carbon black, trouble of foreign matter coming from unknown cause occurs very often. Analysis of a portion of the foreign matter for its cause survey often results in that the portion is composed of the same components to rubber substrate. Mysteriously this trouble naturally disappears, and occurs again sometimes.

On the other hand, there are many products manufactured by molding process in the rubber molding technology. Rubber vibration isolator obtained by injection is one of the products using a rubber composition for molding. Materials for injection are fed as a ribbon-like compound sheeted out using a roll. Tear of the ribbon lowers stability of material feeding and makes continuous production impossible. Such a material may show an abrupt viscosity increase in a feeder of the injection machine and leads to poor flow in a mold after injection. The products molded in such state often had a trouble such as an occurrence of crack during durability test.

Materials used for molding weather strip corner are required to have stable fluidity of the material. Changes of fluidity in each molding cause a serious problem due to poor adhesion at interface with straight parts of weather strip sponge or inferior appearance at joint area.

Fixing roll for copying machine, one of OA rolls, is a foam product having semi conductivity. It often had variation troubles in foaming and electric resistance due to unknown cause.

O-ring product also had troubles of uneven product shrinkage in each molding by unknown cause. Another problem was lowering in mechanical strength of product even with good product appearance.

Analysis of substrate for cause survey often resulted in no specific difference in the substrate composition. These phenomena are troublesome and mysterious because they naturally disappear after a while and the same troubles occur again sometimes.

At present, these trouble is considered to be caused by formation of a physical network originated in carbon black/rubber interface produced in the compound during mixing. That is, this network causes the troubles described above in molding a product.

To solve such problems, adding of polysulfide compounds including sulfur or sulfur compounds as radical scavenger has been disclosed in JP-A-H7-138379.

The addition of such sulfur or sulfur compounds at loading level of about $1.0 \times 10^{-2}$ mole per 100 weight parts of polymer in a mixer, however, causes start of cross linking by the presence of zinc oxide (ZnO) contained in the compound and leads to a problem of gelation (chemical burning). Loading level of about $1.0 \times 10^{-3}$ mole, $\frac{1}{10}$ of the above loading level, is safe in view of the burning in a mixer, but has little effect to solve the problems mentioned above.

DISCLOSURE OF THE INVENTION

First object of the invention is to solve such problems described above accompanied with conventional technology, and provide a rubber composition for extrusion to give a ribbon-like compound prepared prior to extrusion having no crack nor tear, stable cross sectional shape of extrudate, and foamed products with little variation in foaming, and also products made of the said rubber composition such as weather strip sponge, high extension seal, glass run channel, window frame and water hose for automobile.

Second object of the invention is to provide a rubber composition for molding to give a compound prepared for injection having no tear phenomenon, superior fluidity in a mold, in addition stable foaming and little variation in foaming in cast sponge, and also products made of the said composition with good surface texture and superior mechanical strength such as rubber vibration isolator, cast sponge, grommet, O-ring, packing, boots, window frame, break piston cup and OA roll products.

The invention includes the following disclosures.

(1) A rubber composition for extrusion comprising 100 weight parts of ethylene/α-olefin/non-conjugated polyene copolymer rubber (A) composed of ethylene, α-olefin having carbon atoms of 3–20 and non-conjugated polyene, and at least 30–300 weight parts of carbon black (B) and $1.0 \times 10^{-5} – 5.0 \times 10^{-3}$ mol of alkoxysilane compound (C) shown by the following formula (I):

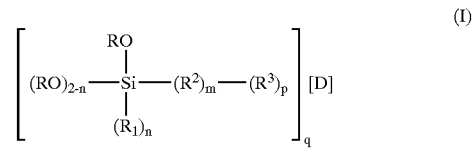

wherein, R is an alkyl group having carbon atoms of 1–4 or an alkoxy group having carbon atoms of 1–4, $R^1$ is an alkyl group having carbon atoms of 1–4 or phenyl group, n is 0, 1 or 2, $R^2$ is a bivalence of linear or branched hydrocarbon group having carbon atoms of 1–6, $R^3$ is an arylene group having carbon atoms of 6–12, m and p are 0 or 1 respectively, and m and p are not 0 at a same time, q is 1 or 2, D is —SCN or —SH when q is 1, and —Sx— when q is 2 (wherein x is an integer of 2–8).

(2) The rubber composition for extrusion according to item 1, wherein the ethylene/α-olefin/non-conjugated polyene copolymer rubber (A) (i) comprises a unit (a) derived from ethylene and a unit (b) derived from α-olefin having carbon atoms of 3–20 in a [(a)/(b)] molar ratio of 50/50–90/10, (ii) has an iodine value of 1–40, and (iii) has an intrinsic viscosity [η] measured in decalin at 135° C. of 2.0–4.5 dl/g.

(3) The rubber composition for extrusion according to item 1, wherein an amount of the carbon black (B) is 50–200 weight parts to 100 weight parts of the ethylene/α-olefin/non-conjugated polyene copolymer rubber (A).

(4) The rubber composition for extrusion according to item 1, wherein an amount of the carbon black (B) is 61–200 weight parts to 100 weight parts of the ethylene/α-olefin/non-conjugated polyene copolymer rubber (A).

(5) The rubber composition for extrusion according to item 1, wherein an amount of the carbon black (B) is 70–200 weight parts to 100 weight parts of the ethylene/α-olefin/non-conjugated polyene copolymer rubber (A).

(6) The rubber composition for extrusion according to any one of items 1–5, wherein its apparent activation energy is 20–300 kJ/mol, and a change rate of the apparent activation energy is not higher than 40% even after processing in any rubber processing process.

(7) A rubber composition for extrusion, wherein it does not show any ribbon break nor ribbon crack, and has a change rate in die swell ratio not higher than 5% due to a rise of viscosity in an extruder.

(8) A weather strip sponge product, highly expanded seal product, glass run channel product, window frame product or water hose product for automobile characterized by comprising the rubber composition according to any one of items 1–7.

(9) A process for manufacturing a vulcanized rubber molding product comprising forming the rubber composition according to any one of items 1–7 to an intended shape using an extruder and vulcanizing it.

(10) A rubber composition for molding comprising 100 weight parts of an ethylene/α-olefin/non-conjugated polyene copolymer rubber (A) composed of ethylene, α-olefin having carbon atoms of 3–20 and non-conjugated polyene, and at least 30–300 weight parts of carbon black (B) and $1.0 \times 10^{-5} – 5.0 \times 10^{-3}$ mol of alkoxysilane compound (C) shown by the following formula (I):

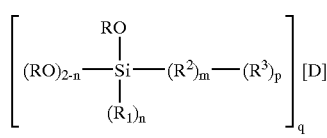

wherein, R is an alkyl group having carbon atoms of 1–4 or an alkoxy group having carbon atoms of 1–4, $R^1$ is an alkyl group having carbon atoms of 1–4 or phenyl group, n is 0, 1 or 2, $R^2$ is a bivalence of linear or branched hydrocarbon group having carbon atoms of 1–6, $R^3$ is an arylene group having carbon atoms of 6–12, m and p are 0 or 1 respectively, and m and p are not 0 at a same time, q is 1 or 2, D is —SCN or —SH when q is 1, and —Sx— when q is 2 (wherein x is an integer of 2–8).

(11) The rubber composition for molding according to item 10, wherein the ethylene/α-olefin/non-conjugated polyene copolymer rubber (A) (i) comprises a unit (a) derived from ethylene and a unit (b) derived from α-olefin having carbon atoms of 3–20 in a [(a)/(b)] molar ratio of 50/50–90/10, (ii) has an iodine value of 1–40, and (iii) has an intrinsic viscosity [η] measured in decalin at 135° C. of 0.8–4.5 dl/g.

(12) The rubber composition for molding according to item 10, wherein an amount of the carbon black (B) is 50–200 weight parts to 100 weight parts of the ethylene/α-olefin/non-conjugated polyene copolymer rubber (A).

(13) The rubber composition for molding according to item 10, wherein an amount of the carbon black (B) is 61–200 weight parts to 100 weight parts of the ethylene/α-olefin/non-conjugated polyene copolymer rubber (A).

(14) The rubber composition for molding according to item 10, wherein an amount of the carbon black (B) is 80–200 weight parts to 100 weight parts of the ethylene/α-olefin/non-conjugated polyene copolymer rubber (A).

(15) The rubber composition for molding according to any one of items 10–14, wherein its apparent activation energy is 20–200 kJ/mol, and a change rate change of the apparent activation energy is not higher than 20% even after processing in any rubber processing process.

(16) The rubber composition for molding according to any one of items 10–15, wherein, the composition does not break in a ribbon preformed prior to injection and has a good fluidity in mold which does not vary, and physical properties of the composition after vulcanization do not vary depending on mixing conditions in a preparation of the compound.

(17) A rubber vibration insulator, cast sponge, grommet, O-ring, packing, boots, window frame, break piston cup or OA roll product characterized by comprising the rubber composition according to any one of items 10–16.

(18) A process for manufacturing a vulcanized rubber molding product comprising forming the rubber composition according to any one of items 10–16 to a shape suitable to a molding machine then vulcanizing it.

A rubber composition for extrusion and a rubber composition for molding of the invention comprise 100 weight parts of ethylene/α-olefin/non-conjugated polyene copolymer rubber composed of ethylene, α-olefin having carbon atoms of 3–20 and non-conjugated polyene (A), and at least 30–300 weight parts of carbon black (B) and $1.0 \times 10^{-5} – 5.0 \times 10^{-3}$ mol of alkoxysilane compound shown by the above described formula (I).

Ethylene/α-olefin/non-conjugated Polyene Copolymer Rubber (A)

α-Olefin having carbon atoms of 3–20 in ethylene/α-olefin/non-conjugated polyene copolymer rubber (A) used in the invention specifically includes propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 9-methyl-1-decene, 1-methyl-1-dodecene, 12-ethyl-1-tetradecene and the like. These α-olefins may be used alone or in combination of two or more. Among these α-olefins, those having carbon atoms of 3–8 such as propylene, 1-butene, 4-methyl-1-pentene, 1-hexene and 1-octene are particularly preferable.

In order to obtain a rubber composition providing vulcanized rubber molded products with superior heat aging resistance, strength characteristics, rubber elasticity, low temperature properties and process ability, the ethylene/α-olefin/non-conjugated polyene copolymer rubber (A) preferably comprises (a) an ethylene-derived unit and (b) an α-olefin-derived unit having carbon atoms of 3–20 in [(a)/(b)] molar ratio of 50/50–90/10. The [(a)/(b)] molar ratio described above is preferably 65/35–90/10, more preferably 65/35–85/15 and particularly preferably 65/35–80/20.

As a non-conjugated polyene in the ethylene/α-olefin/non-conjugated polyene copolymer rubber (A), a cyclic or linear non-conjugated polyene may be used.

The cyclic non-conjugated polyene includes, for example, dienes such as methyltetrahydroindene, 5-ethylidene-2-norbornene, 5-methylene-2-norbornene, 5-isopropylidene-2-norbornene, 5-vinyl-2-norbornene, 6-chloromethyl-5-isopropenyl-2-norbornene, dicyclopentadiene and norbornadiene; triene such as 2,3-diisopropylidene-5-norbornene, 2-ethylidene-3-isopropylidene-5-norbornene and 2-propenyl-2,5-norbornadiene.

And as the linear non-conjugated polyene includes, for example, dienes such as 1,4-hexadiene, 3-methyl-1,4-hexadiene, 4-methyl-1,4-hexadiene, 5-methyl-1,4-hexadiene, 4,5-dimethyl-1,4-hexadiene, 6-methyl-1,6-octadiene, 7-methyl-1,6-octadiene, 6-ethyl-1,6-octadiene, 6-propenyl-1,6-octadiene, 6-methyl-1,6-octadiene, 6-methyl-1,6-nonadiene, 7-methyl-1,6-nonadiene, 6-ethyl-1, 6-nonadiene, 7-ethyl-1,6-nonadiene, 6-methyl-1,6-decadiene, 7-methyl-1,6-decadiene, 6-methyl-1,6-undecadiene and 7-methyl-1,6-octadiene; and triene such as 4-ethylidene-1,6-octadiene, 4-ethylidene-7-methyl-1,6-octadiene, 4-ethylidene-7-methyl-1,6-nonadiene, 4-ethylidene-6,7-dimethyl-1,6-octadiene, 4-ethylidene-6,7-dimethyl-1,6-nonadiene, 4-ethylidene-1,6-decadiene, 4-ethylidene-7-methyl-1,6-decadiene, 4-ethylidene-7-methyl-6-propenyl-1,6-octadiene, 4-ethylidene-1,7-nonadiene, 4-ethylidene-8-methyl-1,7-nonadiene, 4-ethylidene-1,7-undecadiene, 4-ethylidene-8-methyl-1,7-undecadiene, 4-ethylidene-7,8-dimethyl-1,7-nonadiene, 4-ethylidene-7,8-dimethyl-1,7-decadiene, 4-ethylidene-7,8-dimethyl-1,7-undecadiene, 7-ethyl-4-ethylidene-8-methyl-1,7-undecadiene, 4-ethylidene-7,8-diethyl-1,7-decadiene, 4-ethylidene-9-methyl-1,8-decadiene, 4-ethylidene-8,9-dimethyl-1,8-decadiene, 4-ethylidene-10-methyl-1,9-undecadiene, 4-ethylidene-9,10-dimethyl-1,9-undecadiene, 4-ethylidene-11-methyl-1,10-dodecadiene, 4-ethylidene-10,11-dimethyl-1,10-dodecadiene and 3,7-dimethyl-1,4,8-decatriene.

These non-conjugated polyenes may be used alone or in combination of two or more.

In view of obtaining a rubber composition having high crosslinking efficiency and capable to provide vulcanized rubber molded products with superior compression set, along with an advantage in cost, iodine value of the ethylene/α-olefin/non-conjugated polyene copolymer rubber (A) is preferably 1–40, more preferably 1–30.

In order to obtain a rubber compound to provide vulcanized rubber molded products with superior strength characteristics, compression set and process ability, intrinsic viscosity [η] of ethylene/α-olefin/non-conjugated polyene copolymer rubber (A), measured in decalin at 135° C. is preferably 2.0–4.5 dl/g, more preferably 2.2–4.0 dl/g in the rubber composition for extrusion of the invention, and is preferably 0.8–4.5 dl/g, more preferably 0.9–4.0 dl/g in the rubber composition for molding.

Carbon Black (B)

In the rubber composition for extrusion of the invention, carbon black (B) may be used at 30–300 weight parts, preferably at 50–200 weight parts, more preferably at 61–200 weight parts and most preferably at 70–200 weight parts per 100 weight parts of the ethylene/α-olefin/non-conjugated polyene copolymer rubber (A) in order to obtain a rubber composition to be able to provide vulcanized extruded rubber products with sufficient mechanical strength. And in the rubber composition for molding of the invention, carbon black (B) may be used at 30–300 weight parts, preferably at 50–200 weight parts, more preferably at 61–200 weight parts and most preferably at 80–200 weight parts per 100 weight parts of ethylene/α-olefin/non-conjugated polyene copolymer rubber (A) in order to obtain a rubber composition to be able to provide vulcanized molded rubber products with sufficient mechanical strength.

As the carbon black (B), SRF, GPF, FEF, MAF, HAF, ISAF, SAF, FT, MT and the like may be used. In order to obtain a rubber composition to be able to provide vulcanized rubber molded products with superior mechanical strength and surface texture of products, specific surface area by nitrogen absorption of carbon black (B) is preferably 10–100 m$^2$/g.

Alkoxysilane Compound (C)

In the invention, an alkoxysilane compound (C) shown by the formula (I) described above is compounded to reduce a change rate in activation energy of a compound and suppress the formation of physical network originating from carbon black/polymer interface in the compound during mixing. In order to obtain sufficient effects and maintain vulcanization rate and rubber elasticity, loading level of the alkoxysilane compound (C) should be $1.0 \times 10^{-5}$–$5.0 \times 10^{-3}$ mole, preferably $1.0 \times 10^{-4}$–$4.0 \times 10^{-3}$ mole and further preferably $1.0 \times 10^{-4}$–$2.1 \times 10^{-3}$ mole per 100 weight parts of the ethylene/α-olefin/non-conjugated polyene copolymer rubber (A).

Alkoxysilane compound (C) may be used as an impregnated form into calcium carbonate or carbon black (B) in advance.

In the formula (I) described above, alkyl group having carbon atoms of 1–4 shown as R or $R^1$ includes, for example, methyl, ethyl, n-propenyl, isopropyl, n-buthyl, isobutyl, sec-butyl and tert-butyl. Alkoxy group having carbon atoms of 1–4 shown as R includes, for example, methoxy, ethoxy, propoxy, isopropoxy, n-butoxy, isobutoxy, sec-butoxy and tert-butoxy. Linear or branched bivalent hydrocarbon group having carbon atoms of 1–6 shown as $R^2$ includes, for example, alkylene group such as methylene, dimethylmethylene, ethylene, dimethylethylene, trimethylene, tetramethylene, 1,2-cyclohexylene and 1,4-cyclohexylene; alkylidene group such as cyclohexylidene; arylalkylene group such as diphenylmethylene and diphenylethylene. Arylene group having carbon atoms of 6–12 shown as $R^3$ includes, for example, phenylene, naphthylene and biphenylylene.

Typical examples of the alkoxysilane compound (C) shown in the formula (I) described above includes bis-3-(trimethoxysilyl) propyltetrasulfane [(CH$_3$O)$_3$ Si—(CH$_2$)$_3$—S$_4$—(CH$_2$)$_3$—Si(OCH$_3$)$_3$], bis-3-(triethoxysilyl) propyltetrasulfane [(C$_2$H$_5$O)$_3$Si—(CH$_2$)$_3$—S$_4$—(CH$_2$)$_3$—Si (OC$_2$H$_5$)$_3$] and bis-3-(tripropoxysilyl)propyltetrasulfane [(C$_3$H$_7$O)$_3$Si—(CH$_2$)$_3$—S$_4$—(CH$_2$)$_3$—Si(OC$_3$H$_7$)$_3$].

Other Components

A rubber composition for extrusion and molding of the invention may be compounded with additives known in the art other than carbon black (B), such as rubber reinforcing agents, inorganic fillers, softening agents, antioxidants, processing aids, foaming agents, co-foaming agents, vulcanization accelerators, organic peroxides, vulcanization promoters, colorants, dispersing agents, flame retardants and the like, at loading level not impairing purposes of the invention, depending on intended applications of vulcanized products, etc.

The rubber reinforcing agents described above have an enhancing effect on mechanical properties such as tensile strength, tear strength and wear resistance and the like. Typical examples of such rubber reinforcing agents include fine powder of silicic acid, silica and the like. These may be pretreated with silane coupling agents.

Typical examples of silica are fumed silica and precipitated silica and the like. These silica may be applied with surface treatment by reactive silane such as mercaptosilane, aminosilane, hexamethyldisilazane, chlorosilane and alkoxylsilane or siloxane of low molecular weight.

Types and loading levels of these rubber reinforcing agents may be suitably selected depending on applications, and maximum loading levels, except for carbon black (B), are generally 150 weight parts, preferably 100 weight parts per 100 weight parts of the ethylene a α-olefin/non-conjugated polyene copolymer rubber (A).

Typical inorganic fillers described above include light calcium carbonate, ground calcium carbonate, talc, clay and the like.

Types and loading levels of these inorganic fillers may be suitably selected depending on applications and maximum loading levels are generally 300 weight parts, preferably 200 weight parts per 100 weight parts of the ethylene/α-olefin/non-conjugated polyene copolymer rubber (A).

As the softening agents described above, those generally used for rubber may be used. They include, typically, petroleum based softening agents such as process oil, lubricating oil, paraffin oil, liquid paraffin, petroleum asphalt and vaseline; coal tar based softening agents such as coal tar and coal tar pitch; fatty oil based softening agents such as castor oil, linseed oil, rapeseed oil, soybean oil and coconut oil; tall oil; rubber substitute (factice); waxes such as beeswax, carnauba wax and lanolin; fatty acids and salts thereof such as ricinolic acid, palmitic acid, stearic acid, barium stearate, calcium stearate and zinc laurate; naphthenic acid; pine oil, rosin or derivatives thereof; synthetic polymer materials such as terpene resin, petroleum based resin, atactic polypropylene and coumarone-indene resin; ester based softening agents such as dioctyl phthalate, dioctyl adipate and dioctyl sebacate; microcrystalline wax, liquid polybutadiene, modified liquid polybutadiene, liquid Thiokol, hydrocarbon based synthetic lubricating oil and the like. Among these, petroleum based softening agents, in particular, process oil is suitably used. Loading levels of these softening agents may be selected depending on applications of vulcanized products.

The antioxidants described above include, for example, amine based, hindered phenol based or sulfur based antioxidant and the like, and may be used in the range of loading level not to impair purposes of the invention. Amine based antioxidants include diphenylamine, phenylenediamine and the like. Sulfur based antioxidants include those usually adopted in rubber.

As the processing aids described above, those generally adopted in rubber processing may be used. Typically, higher fatty acids such as linoleic acid, ricinolic acid, stearic acis, palmitic acid and laulic acid; salts of higher fatty acids such as barium stearate, zinc stearate and calcium stearate; esters of higher fatty acids described above and the like are included. These processing aids may be used at not more than 10 weight parts, preferably not more than 5 weight parts per 100 weight parts of the ethylene/α-olefin/non-conjugated polyene copolymer rubber (A), however, it is desirable to suitably determine an optimal amount depending on required physical properties.

Foaming agents typically include inorganic foaming agents such as sodium bicarbonate, sodium carbonate, ammonium bicarbonate, ammonium carbonate and ammonium nitrite; nitroso compounds such as N,N'-dimethyl-N, N'-dinitrosoterephthalamide and N,N'-dinitrosopentamethylenetetramine (DPT); azo compounds such as azodicarbonamide (ADCA), azobisisobutyronitrile (AZBN), azobiscyclohexylnitrile, azodiaminobenzene and barium azodicarboxylate; sulfonylhydrazide compounds such as benzenesulfonylhydrazide (BSH), toluenesulfonylhydrazide (TSH), p,p'-oxybis (benzenesulfonylhydrazide) (OBSH) and diphenylsulfone-3,3'-disulfonylhydrazide; azide compounds such as calcium azide, 4,4'-diphenyldisulfonylazide and p-toluenesulfonylazide.

These foaming agents may generally be used at the ratio of 0.5–30 weight parts, preferably 1–20 weight parts per 100 weight parts of the ethylene/α-olefin/non-conjugated polyene copolymer rubber (A). Use of the foaming agents at the ratio described above enables manufacturing of a foamed product with apparent specific gravity of 0.03–0.8 $g/cm^3$ for the rubber composition for extrusion of the invention, and a foamed product with apparent specific gravity of 0.1–0.8 $g/cm^3$ for the rubber composition for molding of the invention. However, it is desirable to determine suitably an optimal amount depending on required physical properties.

Co-foaming agents may be used in combination with the foaming agents, if necessary. The co-foaming agents act to lower decomposition temperature, accelerate decomposition of the foaming agents and achieve even foaming. Such co-foaming agents include, for example, organic acids such as salicylic acid, phthalic acid, stearic acid and oxalic acid, urea and derivatives thereof. These co-foaming agents may generally be used at the ratio of 0.01–10 weight parts, preferably 0.1–5 weight parts per 100 weight parts of the ethylene/α-olefin/non-conjugated polyene copolymer rubber (A), however, it is desirable to determine suitably an optimal amount depending on required properties.

In addition, another rubber known in the arts may be used by blending with the crosslinkable rubber composition of the invention, so long as not to impair objectives of the invention.

Such another rubber includes natural rubber (NR), isoprene based rubber such as polyisoprene rubber (IR) and conjugated diene based rubber such as polybutadiene rubber (BR), styrene-butadiene rubber (SBR), acrylonitrile-butadiene rubber (NBR) and chloroprene rubber (CR).

Vulcanization agents used for vulcanization include sulfur and sulfur compounds. Typical sulfur includes, powder sulfur, precipitated sulfur, colloidal sulfur, surface treated sulfur, insoluble sulfur and the like. Typical sulfur compounds include sulfur chloride, sulfur dichloride, polymeric polysulfide and sulfur compounds to vulcanize a composition by generating active sulfur at vulcanizationtemperature such as morpholine disulfide, alkylphenol disulfide, tetramethylthiuram disulfide, dipentamethylenethiuram tetrasulfide, Selenium dimethyldithiocarbamate and the like. Sulfur is preferable among these. Sulfur and sulfur compounds may generally be used at the ratio of 0.1–10 weight parts, preferably 0.5–5 weight parts per 100 weight parts of the copolymer rubber (A) described above.

In using sulfur or sulfur compounds as vulcanization agents, combined use of vulcanization accelerators is preferable. Typical vulcanization accelerators include sulfenamide compounds such as N-cyclohexyl-2-benzothiazolesulfenamide (CBS), N-oxydiethylene glycol-2-benzothiazolesulfenamide (OBS), N-t-butyl-2-benzothiazolesulfenamide (BBS) and N,N-diisopropyl-2-benzothiazolesulfenamide; thiazole compounds such as 2-mercaptobenzothiazole (MBT), 2-(2,4-dinitrophenyl)mercaptobenzothiazole, 2-(4-morpholinodithio)benzothiazole, 2-(2,6-diethyl-4-morpholinothio)benzothiazole and dibenzothiazyldisulfide; guanidine compounds such as diphenylguanidine (DPG), triphenylguanidine, diorthotolylguanidine (DOTG), orthotolylbiguanide and diphenylguanidine phthalate; aldehyde amine or aldehyde-ammonium type compounds such as acetaldehyde-aniline condensed compounds, butylaldehyde-aniline condensed compounds, hexamethylenetetramine (H) and acetaldehyde ammonia; imidazoline compounds such as 2-mercaptoimidazoline; thiourea compounds such as thiocarbanilide, diethylthiourea (EUR), dibutylthiburea, tri-methylthiourea and diorthotolylthiourea; thiuram compounds such as tetramethylthiuram monosulfide (TMTM), tetramethylthiuram disulfide (TMTD), tetraethylthiuram monosulfide, tetrabutylthiuram disulfide, tetrakis(2-ethylhexyl)thiuram disulfide (TOT) and dipentamethylene-tetrathiuram sulfide (TRA); salts of dithiocarbamic acid such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthate such as zinc dibutylxanthate; compounds such as zinc white (zinc oxide); and the like. These vulcanization accelerators may generally be used at the ratio of 0.1–20 weight parts, preferably 0.2–10 weight parts per 100 weight parts of the copolymer rubber (A) described above.

Preparation of a Rubber Conmposition and
Vulcanized Rubber Molded Body Thereof

The rubber composition of the invention may be prepared by mixing ethylene/α-olefin/non-conjugated polyene copolymer rubber (A), carbon black (B), alkoxysilane compound (C) and additives such as rubber reinforcing agents, inorganic fillers and softening agents using an internal mixer (closed type mixer) such as Bumbury's mixer and kneader at 80–170° C. for 2–20 min., followed by additional mixing of sulfur together with optional vulcanization accelerators, vulcanization aids, foaming agents and co-foaming agents using a roll such as open role or kneader at roll temperature of 40–80° C. for 5–30 min., then sheeting out.

The rubber composition for extrusion of the invention prepared as described above may be shaped as intended by an extruder and vulcanized at 140–270° C. for 1–30 min. simultaneously with the extrusion or by introducing the extrudate into a vulcanization chamber. Vulcanization process is generally carried out continuously. As a heating method in the vulcanization chamber, a heating measure such as hot air, fluidized bed of glass beads, molten salt bath (LCM), PCM (Powder Curing Medium or Powder Curing Method), UHF (ultra high frequency microwave), steam and the like may be used.

And the rubber composition for molding of the invention prepared as described above may be shaped suitably for a molding machine for molded products. Sheet-like compound is prepared using a roll, etc. in advance for a compression molding and vulcanization machine. In an injection, ribbon-like compound is sheet out roll and stored until molding. In a transfer molding of cast sponge products, ball-like compound is prepared in advance. The compounds thus prepared may be vulcanized by heating at 140–270° C. for 1–30 min.

The inventors, after thorough investigation on the problems accompanied with conventional technology, clarified that the cause is changes in compound viscosity depending on mixing conditions in the ethylene/α-olefin/non-conjugated polyene copolymer rubber system loaded with carbon black. The inventors presumed that the cause is formation of a network between interfaces of carbon black/polymer (FIG. 1) since this phenomenon is specified to the compound system loaded with carbon black. The larger the specific surface area of carbon black is and the higher the loading level of carbon black is, the easier this network tends to be formed. The network also tends to be formed at higher mixing temperature when mixing time is longer. Formation of such network or use of material with generation of origins of such network at carbon black/polymer interfaces results in an abrupt increase in viscosity in an extruder or a mold. It then impairs the production of extrudate due to change in cross sectional shape, that is, change in die swell ratio in the composition for extrusion, and causes fluctuation of fluidity, change in product shrinkage or poor foaming in the composition for molding. Furthermore, in any case of the rubber composition for extrusion and molding, a ribbon crack phenomenon occurs, that is, cracks occur at bending part of the compound during storage after mixing in a mixer and forming to a ribbon-like compound, and thus leads to a serious problem like a lowering in continuous productivity.

For a rubber composition for extrusion and molding, it is very important not to have such viscosity increase which is closely relating to inferior product ratio.

For a further precise explanation, this network means structural change occurred inside a compound.

As an index to express the structural change in the compound by mixing, an apparent activation energy is used in the Examples described hereinafter. The activation energy is obtained from a temperature dependency of viscosity, and determined by quality of the polymer to be used, compounding of carbon black and the like and loading levels of these materials. Its value becomes smaller when the network (physical structural change) described above is formed.

The inventors, after a thorough investigation, found that the apparent activation energy of the rubber composition for extrusion should be 20–300 kJ/mole, preferably 30–250 kJ/mole, and more preferably 30–200 kJ/mole, and also that a change rate between the apparent activation energy after mixing by rubber mixer and that of right after extrusion in the next process should be not higher than 40%, preferably not higher than 30%, and more preferably not higher than 25% to solve the problems associated with conventional technology. Similarly, the inventors found that the apparent activation energy of the rubber composition for molding should be 20–200 kJ/mole, preferably 30–150 kJ/mole, and more preferably 30–120 kJ/mole, and also that a change rate between the apparent activation energy after mixing by rubber and that of sheet-like, ribbon-like or ball-like compound in the case of transfer molding should be not higher than 20%, preferably not higher than 15%, and further preferably not higher than 10% to solve the problems associated with conventional technology.

Here, the apparent activation energy can not be measured in the presence of vulcanization agents because vulcanization proceeds during the measurement. Therefore, it was evaluated using the compounds without the vulcanization agents in the Examples described hereinafter. In ordinary production, ribbon-like compounds, materials extruded from extruder or compounds before molding contain the vulcanization agents. Results obtained by measurement of the apparent activation energy to grasp and control the effects of the invention do not change by the presence or absence of the vulcanization agents.

Based on these consideration, in preparation of the rubber composition for extrusion of the invention, it is desirable to mix under such conditions that the apparent activation energy of compound (1) obtained by the mixing procedure according to JIS K6395 with an open roll of 8 inch φ becomes generally 20–300 kJ/mole, preferably 30–250 kJ/mole, and further preferably 30–200 kJ/mole. Furthermore, it is desirable to mix under such conditions that the apparent activation energy of compound (2) obtained by mixing with a mixer usually used in the rubber industry and then extruding with a extruder for rubber becomes 20–300 kJ/mole and the change rate (%) of the activation energy expressed by the following formula:

[1−(apparent activation energy of compound (2))/(apparent activation energy of compound (1))]×100 becomes generally not higher than 40%, preferably not higher than 30%, and more preferably not higher than 20% as the result of the reaction between carbon black (B) and alkoxysilane compound (C) (silane coupling agent).

And also, in preparation of the rubber composition for molding of the invention, it is desirable to mix under such conditions that the apparent activation energy of compound (1) obtained by the mixing procedure according to JIS K6395 with an open roll of 8 inch φ becomes generally 20–200 kJ/mole, preferably 30–150 kJ/mole, and further preferably 30–120 kJ/mole. Furthermore, it is desirable to mix under such conditions that the apparent activation energy of compound (2) obtained by mixing with a mixer usually used in the rubber industry and then forming to sheet-like for molding or ribbon-like for injection becomes 20–200 kJ/mole and the change rate (%) of the activation energy expressed by the following formula:

[1−(apparent activation energy of compound (2))/(apparent activation energy of compound (1))]×100 becomes generally not higher than 20%, preferably not higher than 15%, and more preferably not higher than 10% as a result of the reaction between carbon black (B) and alkoxysilane compound (C) (silane coupling agent).

Under coexistence of zinc oxide and silane coupling agent, the silane coupling agent react with zinc oxide first resulting in decrease of the silane coupling agent to be combined with carbon black surface, increased change rate of the activation energy of the material, and lowering of the effect of the silane coupling agent. That is, the change rate of the activation energy of material becomes an important parameter to obtain the effect of the silane coupling agent.

In the Examples described hereinbelow, reasons for adopting the activation energy of compounds mixed with an open roll of 8 inch φ as the standard are: No formation of the network described above in a compound due to low mixing temperature (temperatures of front roll/back roll=50° C./50° C.), and expectable stabilization of radicals generated by polymer chain scission induced by shear due to presence of oxygen, along with possible better dispersion of carbon black, etc. compared with other mixers. The network among carbon black/polymer interfaces discussed in the invention is hardly formed in an open state (in the presence of oxygen) and at mild mixing temperature. In order to quantify and control amount of the network formed in a closed type mixer generally used in mixing process in the rubber industry, the state of network is quantified using the apparent activation energy as a standard value. Larger change rate in apparent activation energy by mixing means more network formation in a mixer and gives the problems of ribbon crack or tear. Furthermore, even if such phenomena do not happen in a mixer, the compound with origin of network formation gives abrupt increase in viscosity and thus resulting in fluctuation of fluidity or extrusion out put, changes in product cross sectional shape or shrinkage and inferior foaming.

Reasons for the suppression effect of alkoxysilane (C) on network formation is rapid reaction of silanol functional group in its chemical structure with active species (carboxyl group, lactone, hydroxyl group, ketone group and phenol group) at carbon black surface and rapidly covering the surface during reaction, along with stabilization effect of polysulfide group on the origin points (at carbon black/polymer interface) for network formation among the interfaces.

That is, alkoxysilane (C), even in very small amount, effectively and rapidly disperses to carbon black/polymer interfaces, cause points for viscosity increase to raise the problem in extrusion and molding of a compound material, and stabilizes origin sites of network formation and thus suppresses the network formation. Since this effect is obtained with very small amount there is no fear of burning in mixing, a problem of polysulfide compounds such as sulfur in conventional technology described above.

A vulcanized rubber product thus obtained are used for sponge weather strip, seal products with high extension, glass run channel, window frame and water hose for automobile, in the rubber composition for extrusion of the invention, whereas rubber vibration isolator, cast sponge, grommet, O-ring, packing, boots, window frame, break piston cup and OA roll, in the rubber composition for molding of the invention.

BRIEF DESCRIPTION OF THE DRAWINGS

In FIGS. 3 and 4, 1 shows tubular sponge, and in FIG. 3, 2 shows a molded product.

Figure 1:
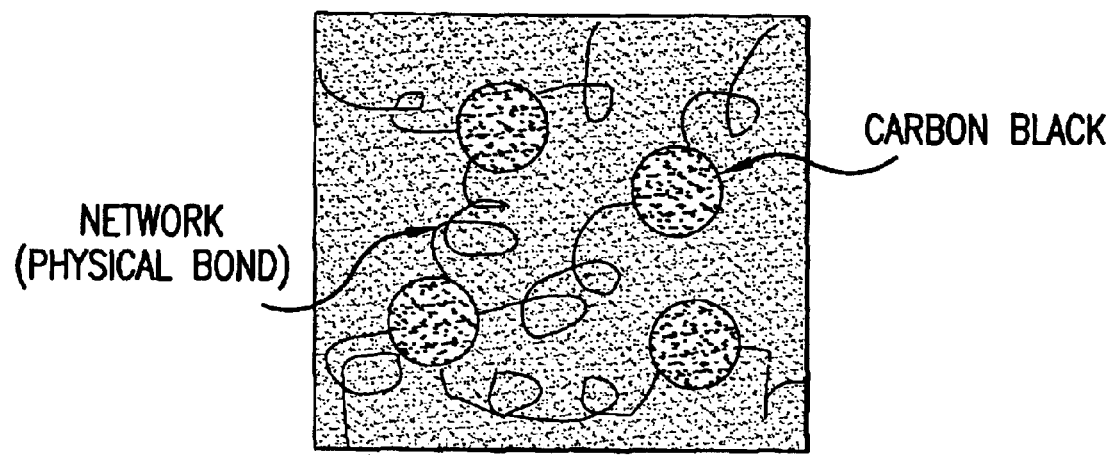
FIG. 1 shows a state of physical network formation among carbon black/polymer interfaces

This specification includes part or all of contents as disclosed in the specifications of Japanese Patent Applications Nos. 11(1999)-209036 and 11(1999)-223639, which are the base of the priority claim of the present application.

BEST MODE FOR CARRYING OUT THE INVENTION

The invention will be further explained specifically by Examples and Comparative Examples that follow, however, the scope of the invention should not be restricted by these Examples.

Various physical properties and their measurement methods in Examples and Comparative Examples are as follows.

[Apparent Activation Energy]

1) Measurement was carried out using RDS-II made by Rheometrix Co., Ltd.

2) Sample preparation: A sheets of 2 mm thickness was prepared from a compound containing no vulcanization agent nor accelerator at 190° C. for 5 min. using 50 ton press machine.

3) Measurement conditions: Complex viscosity coefficient was measured at each temperature of 170° C., 190° C. and 210° C. under frequency of 0.1–15 Hz (strain: 1%, stabilization time at each temperature: 3 min.).

4) Calculation of Activation Energy Frequency dependencies of complex viscosity coefficient were measured at 170° C., 190° C. and 210° C., and apparent activation energy at 190° C. was obtained according to the following equations.

$a_T = A \exp[Ea/R(T-Tref)]$ $\eta_T = a_T \eta_{T0}$ $\eta_T$ and $\eta_{T0}$: Complex viscosity coefficient at T and $T_0$, respectively, Tref: Standard temperature (190° C.), $a_T$: Shift factor, A: Frequency factor, Ea: Apparent activation energy, R: Gas constant T: Temperature.

Quantification Index of Network (Physical Structural Change):

(For Rubber Composition for Extrusion)

Change rate of activation energy (%)=[1−((2)/(1))]×100

(1): Standard value=Apparent activation energy of a compound obtained by mixing on an open roll of 8 inch φ for 21 min.

(2): Apparent activation energy of a compound right after injection by an injection machine in the next process.

(For Rubber Composition for Molding)

Change rate of activation energy (%)=[1−((2)/(1))]×100

(1): Standard value=Apparent activation energy of a compound obtained by mixing on an open roll of 8 inch φ in accordance with JIS K6395.

(2): Apparent activation energy of a sheet-like compound prepared for molding or a ribbon-like compound prepared for injection in the next process.

[Die Swell Ratio]

A compound containing no vulcanization agent nor accelerator was wound on an open roll of 8 inch φ (roll clearance: 5 mm) and mixed for 2 min. then sheeted out in ribbon-like shape. The compound was then fed to 50 mm extruder SCER (made by Shimadzu Corp.) and extruded through a nozzle with L/D=60 mm/2 mm under shear rate of $10^2$ sec$^{-1}$ and diameter of cross section (A) (mm) of extrudate was measured. Die swell ratio was obtained according to the following formula.

die swell ratio=A/2 (nozzle diameter in mm)

[Ribbon Crack Test] (For Rubber Composition for Extrusion)

A ribbon-like compound was cut to 30 cm in length, folded at the center and both ends were fixed. Bending surface was checked on crack and breakage after leaving in an oven at 40° C. for 24 hrs.

[Ribbon Tear and Breakage test] (For Rubber Composition for Molding)

A ribbon-like compound with the dimension of 5 mm T×40 mm W×300 mm L was prepared using a roll of 8 inch φ and stored in an oven at 40° for 1 hr. The ribbon was then extended to 350 mm and occurrence of tear and breakage was evaluated.

[Product Surface Texture (Sensory Inspection)]

A tubular sponge rubber was cut to 30 mm in length, irradiated from above with 60 W lamps, and checked visually from the angle at which surface looked glossy(full mark is 5 point)

5 point: strongly glossy with smooth surface 3 point: glossy but with relatively rough surface 1 point: no gloss with rough surface (4 or 2 point means intermediate level between 5 and 3 points and 3 and 1 points respectively)

[Mooney Viscosity]

Mooney viscosity (Vm) was obtained at 140° C., on green rubber according to JIS K6300, and Mooney scorch time ($t_5$) was determined at 125° C.

[($M_{100}$ (100% Modulus)]

It was measured in accordance with JIS K6251.

[$M_{300}$ (300% Modulus)]

It was measured in accordance with JIS K6251.

[Tensile Test] (For Rubber Composition for Extrusion)

A vulcanized rubber sheet was obtained at 170° C. for 10 min. using a 150 ton press machine. Tensile strength at break ($T_b$) and elongation at break ($E_b$) were measured at 23° C. under 500 mm/min of rate of tension in accordance with JIS K6251.

[$H_A$ (Product Hardness)] (For Rubber Composition for Extrusion)

Product hardness was measured with vulcanized sheet of 2 mm thick piled up to 12 mm using durometer A in accordance with JIS K6253.

[Tensile Test and Hardness Test] (For Rubber Composition for Molding)

A vulcanized rubber sheet was obtained at 170° C. for 10 min. using a 150 ton press machine. Tensile strength at break ($T_b$), elongation at break ($E_b$) and hardness ($H_A$) were measured at 23° C. under 500 mm/min of rate of tension in accordance with JIS K6251.

[Compression Set Test]

(1) Rubber Composition for Automobile Glass run Channel and Window Frame and Products Thereof Test pieces vulcanized at 170° C. for 15 min were used under the test conditions of 70° C.×22 hrs in accordance with JIS K6262 (1993).

(2) Weatherstrip Sponge Products

A tubular sponge rubber vulcanized in hot air and cut to a length of 30 mm was compressed to a half of the height before loading, and held in a gear oven together with a fixture at 70° C. for 200 hrs. Height of the test piece was measured after taking out of a compression fixture then cooling for 30 min. Compression set was calculated according to the following formula.

Compression set=[($t_0-t_1$)/($t_0-t_2$)]×100 (%)

$t_0$: Height of sample before test $t_1$: Height of sample after thermal treatment and cooling for 30 min.

$t_2$: Height of sample in the sate fixed to a fixture (3) Rubber Composition for Molding Compression set was measured with the test piece vulcanized at 170° C. for 12 min. under the test conditions of 120° C.×22 hrs. in accordance with JIS K6262 (1993).

[Dynamic Viscoelasticity Test]

Dynamic viscoelasticity test was carried out using RSA-2 tester (made by Scientific Far East Co., Ltd.) at 25° C., frequency of 1 Hz/100 Hz and strain ratio of 0.1% to obtain complex modulus of elasticity $E^+$ ($\times 10^7$ dyne/cm$^2$). In addition, dynamic-to-static modulus ratio (index for noisiness in a car) and loss tangent (tan δ) (index for driving comfortableness) were obtained by the formulas below.

$$E^+=E'+iE''$$

($E^+$: Complex modulus of elasticity, E': Dynamic modulus of elasticity, E": Dynamic loss modulus of elasticity)

Dynamic-to-static modulus ratio=$E^+$at 100 Hz/$E^+$ at 1 Hz $$\tan \delta = E''/E'$$

[Foreign Matter Test for Extrusion Products]

A flat plate was prepared from a ribbon-like compound-by-extruding using 60 mm thick extruder and vulcanizing in a microwave. vulcanization chamber (UHF, 200° C., 3 kW) and a hot air vulcanization chamber (HAV, 230° C.) connected in series at take-up speed of 7 m/min. Number of foreign matter (not smaller than 0.03 mm) on surface per 1 m was counted.

[M25 (25% Tensile stress)]
 (a) Test piece: Punched with JIS NO.1 dumb-bell.
 (b) Measurement method: Stress at 25% strain was measured at the rate of extension of 50 mm/min.

[Specific Gravity]

A test piece of 20 mm×20 mm was punched out from hot air vulcanized tubular sponge rubber. Dust on surface was wiped off with alcohol. Masses of this test piece in air and pure water were measured using an automatic specific gravimeter (made by Toyo Seiki Seisaku-Syo Ltd., model M-1) at 25° C. Specific gravity SG of sponge was calculated from difference of both masses.

(Water Absorption Ratio (Wa))

A test piece of 20 mm×20 mm was punched out from hot air vulcanized tubular sponge rubber. Dust on surface was wiped off with alcohol. The test piece was immersed in water at depth of 50 mm and held for 3 min under 125 mmHg. Then, after leaving the test piece for 3 min. under atmospheric pressure, weight of the test piece with water absorbed was measured, and water absorption ratio (Wa) was calculated according to the following formula.

$$Wa \text{ (weight \%)}=[(w_2-w_1)/w_1]\times 100$$

$W_1$: Weight before immersion (g)
$W_2$: Weight after immersion (g)

[Shape Retention Ratio (%)]

Figure 2:
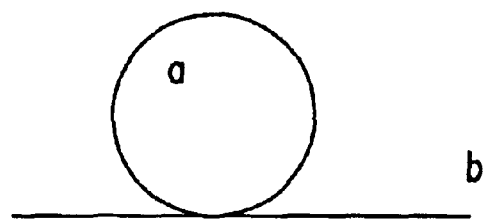
FIG. 2 shows measurement method for shape retention ratio, wherein a and b designate vertical and horizontal direction, respectively.

A test piece having length of 2 mm was cut out from hot air vulcanized tubular sponge rubber. Shape retention ratio (%) was calculated according to the following formula by measuring vertical and horizontal dimensions, a and b, using magnifying glass (see FIG. 2).

$$\text{Shape retention ratio (\%)}=[(a-b)/a]\times 100$$

[Fluidity Test]

Figure 3A:
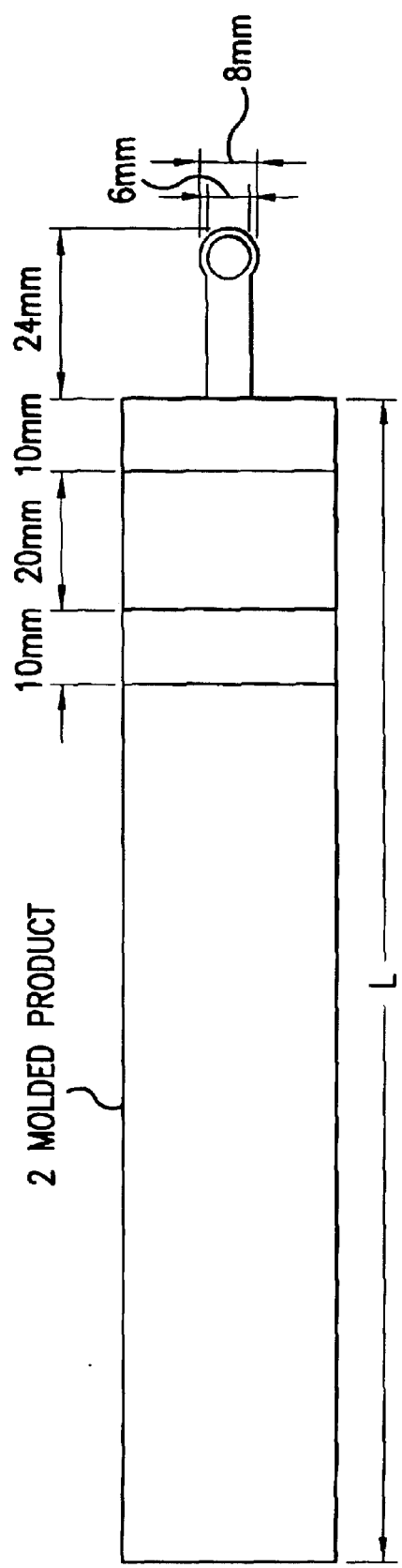
FIG. 3A shows a top view of a molded product,used for the fluidity test in Examples
Figure 3B:
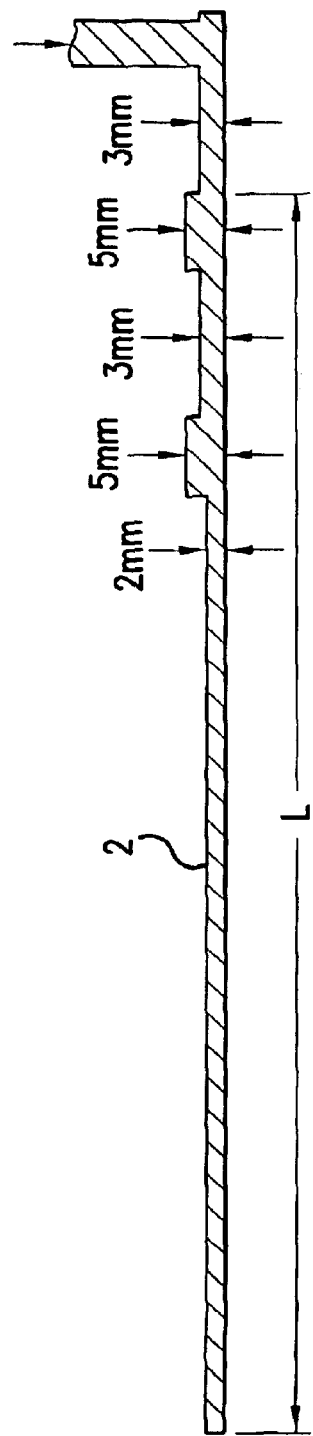
FIG. 3B shows its cross sectional view.

Rubber compound (10 g) was charged into a transfer mold in 10 sec. and vulcanized and foamed at the mold temperature of 180° C. for 3.5 min. Thus obtained vulcanized and foamed rubber molded body shown in FIG. 3 was taken out from mold, and length (L in FIG. 3) of the molded body was measured.

EXAMPLES 1–5 AND COMPARATIVE EXAMPLES 1–5

Rubber Composition for Automobile Glass run Channel and Window Frame and Products thereof A composition including the following components was mixed using 16 L Bumbury's mixer (made by Kobe Steel, Ltd.) under charge ratio of 75%: 100 weight parts (110 weight parts as product weight) of ethylene/propylene/5-vinyl-2-norbornene copolymer rubber (A-1) [molar ratio of ethylene/propylene=68/32, intrinsic viscosity [η] in decalin at 135° C. 3.0 dl/g, iodine value=12, Mooney viscosity (after oil extension)=110, oil content=10 phr (parts per hundred rubber); product of Mitsui Chem. Corp.]175 weight parts of FEF carbon black [Asahi Carbon K.K., trade name: Asahi #60G], 20 weight parts of ground calcium carbonate [Shiraishi Calcium Kaisha Ltd., trade name: Whiton SB], 85 weight parts of softening agent [Idemitsu Kosan Co., Ltd., trade name: Diana Process Oil PW-380], 5 weight parts of zinc white [Sakai Chem. Ind. Co., Ltd., trade name: No. 1], 1 weight part of stearic acid and dimethyldistearylammonium chloride [Lion AkzoCo., Ltd., trade name: Arquad 2HT-F].

Mixing procedures were as follows: Firstly, ethylene/propylene/5-vinyl-2-norbornene copolymer rubber (A-1) was masticated for 15 sec, followed by addition of zinc white, stearic acid, ground calcium carbonate, softening agent and dimethyldistearyl ammonium chloride, and finally carbon black roughly mixed with 0.5 weight parts ($1.0\times 10^{-3}$ mole) of bis-3-(triethoxysilyl)propyltetrasulfane [Degussa Huels AG., trade name: Si-69] (in Comparative Examples 1–5, carbon black itself without blending bis-3-(triethoxysilyl)propyltetrasulfane) was charged and mixed for 4 min. after temperature of the mixture reached at 150° C., with floating weight being maintained in down position. Temperatures of discharged compounds after mixing for 4 min. were as shown in Tables 2 and 3.

The compound thus prepared was then wound around 8 inch φ an open roll of 8 mm φ (surface temperatures of front and back rolls; 50° C., rotation speeds of front and back roll; 18 rpm and 15 rpm, respectively, roll clearance; 5 mm), and then added with sulfur, vulcanization accelerator and calcium oxide [Inoue-Sekkai Kogyo K.K., tradename: Vesta OBS] mixed for 5 min. A ribbon-like compound with 10 mm thickness and 70 mm width was sheeted out and fed to a 50 mm extruder for rubber to produce glass run channel products.

Samples for measurement of activation energy and die swell were prepared similarly by the process described above except for excluding vulcanization agent and vulcanization accelerators in roll mixing.

Formulation of each composition is shown in Table 1 and mixing conditions and results are shown in Tables 2 and 3.

TABLE 1

|  | Example | Comparative Example |
|---|---|---|
|  | 1–5 | 1–5 |
| (Composition) |  |  |
| Copolymer Rubber (A-1) | 110 | 110 |
| Zinc Oxide No. 1 | 5 | 5 |
| Stearic Acid | 1 | 1 |
| Asahi #60G | 175 | 175 |
| Whiton SB | 20 | 20 |
| PW-380 | 85 | 85 |
| Si-69 | 0.5 | 0 |
| Sanceler 22 | 0.7 | 0.7 |
| Sanceler BZ | 1.3 | 1.3 |
| Sanceler MDB | 1.3 | 1.3 |
| Arquad 2HT-F | 1.0 | 1.0 |

TABLE 1-continued

|  | Example 1–5 | Comparative Example 1–5 |
|---|---|---|
| Sulfur | 1.0 | 1.0 |
| Vesta #BS | 5 | 5 |

Vulcanization system: Sulfur 1.0 weight part, vulcanization accelerator 2-mercaptoimidazoline [Sanshin Chem. Ind. Co., Ltd., trade name: Sanceler 22] 0.7 weight part, vulcanization accelerator zinc di-n-butyldithiocarbamate [Sanshin Chem. Ind. Co., Ltd., trade name: Sanceler BZ] 1.3 weight part and vulcanization accelerator 2-(4-morpholinodithio)benzothiazole [SanshinChem. Ind. Co., Ltd. trade name: SancelerMDB] 1.3 weight part.

TABLE 2

|  | Example |  |  |  |  |
|---|---|---|---|---|---|
|  | 1 | 2 | 3 | 4 | 5 |
| (Mixing Conditions) Discharge Temp. - Mixing Time |  |  |  |  |  |
| 150° C. - 4 minutes | ○ |  |  |  |  |
| 160° C. - 4 minutes |  | ○ |  |  |  |
| 170° C. - 4 minutes |  |  | ○ |  |  |
| 170° C. - 8 minutes |  |  |  | ○ |  |
| 175° C. - 15 minutes |  |  |  |  | ○ |
| Compound Temperature after Discharge (° C.) | 162 | 171 | 175 | 179 | 183 |
| Activation Energy ① (kJ/mol) | 158 | 158 | 158 | 158 | 158 |
| Activation Energy ② (kJ/mol) | 151 | 150 | 148 | 148 | 147 |
| Change Rate (%) | 4 | 4 | 6 | 6 | 6 |
| Die Swell Ratio | 1.10 | 1.10 | 1.10 | 1.10 | 1.10 |
| Ribbon Crack Test | No | No | No | No | No |
| Foreign Matter[1] (Piece/m) | 0 | 0 | 0 | 0 | 0 |

[1]Number of foreign matter in the product

TABLE 3

|  | Comparative Example |  |  |  |  |
|---|---|---|---|---|---|
|  | 1 | 2 | 3 | 4 | 5 |
| (Mixing Conditions) Discharge Temp. - Mixing Time |  |  |  |  |  |
| 150° C. - 4 minutes | ○ |  |  |  |  |
| 160° C. - 4 minutes |  | ○ |  |  |  |
| 170° C. - 4 minutes |  |  | ○ |  |  |
| 170° C. - 8 minutes |  |  |  | ○ |  |
| 175° C. - 15 minutes |  |  |  |  | ○ |
| Compound Temperature after Discharge (° C.) | 163 | 170 | 174 | 178 | 181 |
| Activation Energy ① (kJ/mol) | 158 | 158 | 158 | 158 | 158 |
| Activation Energy ② (kJ/mol) | 120 | 80 | 20 | 9 | 6 |
| Change Rate (%) | 24 | 49 | 87 | 94 | 96 |
| Die Swell Ratio | 1.08 | 1.03 | 1.02 | 1.00 | 1.00 |
| Ribbon Crack Test | No | Crack | Break | Break | Break |
| Foreign Matter[1] (Piece/m) | 2 | 5 | 6 | 10 | 15 |

[1]Number of foreign matter in the product

EXAMPLES 6–8 AND COMPARATIVE EXAMPLES 6–8

Similar procedures to Example 1–5 were repeated except varying addition amount of bis-3-(triethoxysilyl) propyltetrasulfane, and mixing using a Banbury and a 8 inch φ roll were carried out at 170° C. for 4 min. Temperature of the compound after discharge was 175° C.

Formulation of each composition is shown in Table 4 and mixing conditions and results are shown in Table 5.

TABLE 4

|  | Example |  |  | Comparative Example |  |  |
|---|---|---|---|---|---|---|
|  | 6 | 7 | 8 | 6 | 7 | 8 |
| (Composition) |  |  |  |  |  |  |
| Copolymer Rubber (A-1) | 110 | 110 | 110 | 110 | 110 | 110 |
| Zinc Oxide No.1 | 5 | 5 | 5 | 5 | 5 | 5 |
| Stearic Acid | 1 | 1 | 1 | 1 | 1 | 1 |
| Asahi #60G | 175 | 175 | 175 | 175 | 175 | 175 |
| Whiton SB | 20 | 20 | 20 | 20 | 20 | 20 |
| PW-380 | 85 | 85 | 85 | 85 | 55 | 55 |
| Si-69 | 0.05 | 0.3 | 1.5 | 0 | 3 | 5 |
| Sanceler 22 | 0.7 | 0.7 | 0.7 | 0.7 | 0.7 | 0.7 |
| Sanceler BZ | 1.3 | 1.3 | 1.3 | 1.3 | 1.3 | 1.3 |
| Sanceler MDB | 1.3 | 1.3 | 1.3 | 1.3 | 1.3 | 1.3 |
| Arquad 2HT-F | 1.0 | 1.0 | 1.0 | 1.0 | 1.0 | 1.0 |
| Sulfur | 1.0 | 1.0 | 1.0 | 1.0 | 1.0 | 1.0 |
| Vesta #BS | 5 | 5 | 5 | 5 | 5 | 5 |

TABLE 5

|  | Example |  |  | Comparative Example |  |  |
|---|---|---|---|---|---|---|
|  | 6 | 7 | 8 | 6 | 7 | 8 |
| (Characteristics of Unvulcanized Rubber) |  |  |  |  |  |  |
| Vm (140° C.) | 40 | 40 | 40 | 40 | 40 | 40 |
| $t_5$ (125° C.) | 10.3 | 10.3 | 12.1 | 8.5 | 15.6 | 17.6 |
| (Ribbon Crack Test) |  |  |  |  |  |  |
| Presence of Crack | No | No | No | Break | No | No |
| Die Swell Ratio | 1.10 | 1.10 | 1.10 | 1.02 | 1.10 | 1.10 |
| Activation Energy ① | 158 | 158 | 158 | 158 | 158 | 158 |
| Activation Energy ② | 143 | 147 | 150 | 20 | 151 | 152 |
| Change Rate (%) | 9 | 7 | 5 | 87 | 4 | 4 |
| (Physical Properties of Vulcanized Rubber[1]) |  |  |  |  |  |  |
| $M_{100}$ (MPa) | 3.74 | 3.45 | 3.27 | 4.3 | 3.01 | 2.97 |
| $M_{300}$ (MPa) | 9.79 | 8.85 | 8.22 | 8.57 | 7.86 | 7.76 |
| $T_B$ (MPa) | 11.3 | 11.0 | 10.2 | 9.21 | 11.2 | 11.8 |
| $E_B$ (%) | 420 | 480 | 470 | 380 | 500 | 530 |
| $H_A$ | 77 | 78 | 77 | 75 | 76 | 75 |
| (Compression Set) |  |  |  |  |  |  |
| 70° C. × 22 h (%) | 15 | 15 | 15 | 30 | 50 | 58 |

TABLE 5-continued

|  | Example | | | Comparative Example | | |
|---|---|---|---|---|---|---|
|  | 6 | 7 | 8 | 6 | 7 | 8 |
| Foreign Matter[2] (Piece/m) | 0 | 0 | 0 | 6 | 0 | 0 |

[1]Conditions: 170° C. × 10 min., 15 min. for CS
[2]Number of foreign matter in the product

COMPARATIVE EXAMPLES 9–14

Similar procedures to Example 3 were repeated except for using equivalent mole of ingredient A shown in Table 6 or 0.03 or 0.3 weight parts of sulfur instead of bis-3-(triethoxysilyl)propyltetrasulfane (mixing conditions: 170° C. for 4 min.).

Results are shown in Table 6.

TABLE 6

|  | Comparative Example | | | | | |
|---|---|---|---|---|---|---|
|  | 9 | 10 | 11 | 12 | 13 | 14 |
| (Component A) | | | | | | |
| Organosilane 1 | ○ | | | | | |
| Organosilane 2 | | ○ | | | | |
| Vinylsilane | | | ○ | | | |
| Accelerator TRA | | | | ○ | | |
| Sulfur (0.03 wt. parts) | | | | | ○ | |
| Sulfur (0.3 wt. parts) | | | | | | ○ |
| Characteristics of Unvulcanized Rubber | | | | | | |
| Vm (140° C.) | 43 | 42 | 41 | 43 | 42 | 68 |
| Die Swell Ratio | 1.05 | 1.05 | 1.05 | 1.00 | 1.05 | NM[2] |
| Activation Energy ① | 158 | 158 | 158 | 158 | 158 | NM[2] |
| Activation Energy ② | 13 | 15 | 12 | 10 | 6 | NM[2] |
| Change Rate (%) | 92 | 90 | 92 | 94 | 96 | |
| (Ribbon Crack Test) | | | | | | |
| Presence of Crack | Break | Break | Break | Break | Break | Break |
| Foreign Matter[1] (Piece/m) | 4 | 4 | 4 | 3 | 2 | NM[2] |

[1]Number of foreign matter in the product
[2]Not measurable

Ingredient A:
Organosilane 1: Dimethoxymethylphenylsilane $(SiC_9H_{14}O_2)$ (Shin-Etsu Chem. Co., Ltd.)
Organosilane 2: Tetrakis(2-methoxyethoxy)silane $((CH_3OCH_2CH_2O)_4Si)$ (Shin-Etsu Chem. Co., Ltd.)
Vinylsilane: Vinyltris(β-methoxyethoxy)silane $((CH_3OCH_2CH_2O)_3SiCH=CH_2)$ (Shin-Etsu Chem. Co., Ltd.)
Vulcanization accelerator TRA: Dipentamethylenethiuram tetrasulfide (Sanshin Chem. Ind. Co., Ltd., trade name: Sanceler. TRA)

EXAMPLES 9–11 AND COMPARATIVE EXAMPLES 15–16

Weatherstrip Sponge Products

A composition consisting of the following components was mixed by 16 L Bumbury's mixer (made by Kobe Steel, Ltd.) under charge ratio of 75% for 6 min: 100 weight parts (120 weight parts as product weight) of ethylene/propylene/5-vinyl-2-norbornene copolymer rubber (A-2) [molar ratio of ethylene/propylene=68/32, intrinsic viscosity [η] in decalin at 135° C.=2.7 dl/g, iodine value=25, Mooney viscosity (ML(1+4) at 125° C.)=45, oil content=20 phr (parts per hundred rubber); product of Mitsui Chem. Corp.], 5 weight parts of activated zinc white [Inoue Sekkai Kogyo K.K., trade name: MetaZ102], 90 weight parts of SRF-H carbon black [Asahi Carbon Co., Ltd., trade name: Asahi #50HG] predetermined amount of bis-3-(triethoxysilyl)propyltetrasulfane [Degussa Huels AG., trade name: Si-69], 70 weight parts of paraffinic process oil [Idemitsu Kosan Co., Ltd., trade name: Diana Process Oil PW-380] and predetermined amount of activator [polyethylene glycol, NOF Corp. trade name: PEG#4000]. Temperature of discharged compound was 165° C. Simultaneous mixing method for whole components was adopted. Predetermined amount of bis-3-(triethoxysilyl)propyltetrasulfane was sprayed on weighed carbon black and charged into the mixer simultaneously with carbon black.

The compound thus prepared was then wound around an open roll of 8 inch φ (surface temperatures of front and back rolls; 50° C., rotation speeds of front and back rolls; 18 rpm and 15 rpm, respectively) and then sulfur, vulcanization accelerator, defoaming agent (calcium oxide; Inoue Sekkai Kogyo K.K., trade name: Vesta 20) and foaming agent [p,p'-Oxybis(benzenesulfonylhydrozide), Eiwa Chem. Ind. Co., Ltd., trade name: Neocelbon N1000SW] were added and mixed for 5 min. A ribbon-like compound with 10 mm thickness and 70 mm width was sheeted out.

Vulcanization and foaming were performed using molding line with a microwave vulcanization chamber (UHF) and a hot air vulcanization chamber (HAV) connected in series or without the former. Temperatures at extruder head and UHF were set at 80° C. and 200° C., respectively, and power was adjusted so that temperature of extrudate surface at the exit of UHF was kept at 180° C. HAV of 30 m length was used and temperature inside the HAV was set at 250° C.

Formulation of each composition and results are shown in Table 7.

EXAMPLES 12

Weatherstrip Sponge Products

A composition consisting of the following components was premixed using 4.3 L Bumbury's mixer at 175° C. for 5 min: 100 weight parts (120 weight parts as product weight) of ethylene/propylene/5-vinyl-2-norbornene copolymer rubber (A-2) [molar ratio of ethylene/propylene=68/32, intrinsicviscosity [η] indecalin at 135° C.=2.7 dl/g, iodine value=25, Mooney viscosity (ML(1+4) at 125° C. content=20 phr (parts per hundred rubber); product of Mitsui Chem. Corp.] and 20 weight parts of propylene homopolymer (melting temperature: 160° C., MFR (190° C., 2.16 kg load in accordance with ASTM D1238): 20 g/10 min and crystallinity: 85%. The compound thus mixed was extruded using 50 mm extruder at 260° C. (in nitrogen sealing), followed by cooling in water to get EPDM/PP alloy. Procedures similar to Examples 9–11 were repeated using the EPDN/PP alloy described above and formulations shown in Table 7. Results are shown in Table 7.

TABLE 7

|  | Example | | | | Comparative Example | |
|---|---|---|---|---|---|---|
|  | 9 | 10 | 11 | 12 | 15 | 16 |
| Copolymer Rubber (A-2) | 120 | 120 | 120 |  | 120 | 120 |
| Polymer (A-3) (EPDM/PP) |  |  |  | 140 |  |  |
| Activated Zinc Oxide | 5 | 5 | 5 | 5 | 5 | 5 |
| Asahi 50HG | 90 | 90 | 90 | 70 | 90 | 90 |
| Si-69 | 0.01 | 0.3 | 1.0 | 0.3 | 3.0 | 0 |
| PW-380 | 70 | 70 | 70 | 70 | 70 | 70 |
| PEG #4000 | 1 | 1 | 1 | 1 | 1 | 4 |
| Vesta 20 | 4 | 4 | 4 | 4 | 4 | 4 |
| N1000SW | 4 | 4 | 4 | 4 | 4 | 4 |
| Physical Properties of Sponge |  |  |  |  |  |  |
| $M_{25}$ (KPa) | 290 | 290 | 290 | 292 | 280 | 270 |
| Specific Gravity | 0.50 | 0.50 | 0.50 | 0.47 | 0.60 | 0.65 |
| Water Absorption (wt %) | 4 | 5 | 5 | 1 | 30 | 20 |
| Activation Energy ① | 70 | 70 | 70 | 70 | 70 | 70 |
| Activation Energy ② | 70 | 69 | 68 | 69 | 70 | 6 |
| Change Rate (%) | 0 | 1 | 1 | 1 | 0 | 91 |
| Die Swell Ratio | 1.30 | 1.30 | 1.30 | 1.29 | 1.30 | 1.00 |
| Shape Retention (%) | 91 | 91 | 91 | 91 | 90 | 94 |
| Compression Set (%) | 21 | 22 | 19 | 17 | 48 | 50 |
| Surface Texture of Product | 5 | 5 | 5 | 5 | 5 | 2 |

Vulcanization system: Sulfur 1.5 weight part, vulcanization accelerator 2-mercapto benzothiazole [Sanshin Chem. Ind. Co., Ltd. trade name: Sanceler M] 1.0 weight part, vulcanization accelerator N-cyclohexyl-2-benzothiazolesulfenamide [Sanshin Chem. Ind. Co., Ltd., trade name: Sanceler CM] 1.0 weight part, vulcanization accelerator diethylthiourea [Sanshin Chem. Ind. Co., Ltd., trade name: Sanceler EUR] 1.0 weight part and vulcanization accelerator tetrakis(2-ethylhexyl)thiuram disulfide [Sanshin Chem. Ind. Co., Ltd., trade name: Sanceler TOT] 1.0 weight part.

EXAMPLES 13–17 AND COMPARATIVE EXAMPLES 17–21

Composition for Rubber Vibration Isolators and Products Thereof

A composition including the following components was mixed by 16 L Bumbury's mixer (made by Kobe Steel, Ltd.) under charge ratio of 75%: 100 weight parts (150 weight parts as product weight) of ethylene/propylene/5-vinyl-2-norbornene copolymer rubber (A-4) [molar ratio of ethylene/propylene=68/32, intrinsic viscosity [η] in decalin at 135° C.=4.0 dl/g, iodine value=22, Mooney viscosity (after oil extension)=110, oil content=50 phr (parts per hundred rubber); product of Mitsui Chem. Corp.], 60 weight parts of FEF carbon black [Asahi Carbon Co., Ltd., trade name: Asahi #60G], 5 weight parts of zinc white [Sakai Chem. Ind. Co., Ltd., trade name: No. 1] and 1 weight part of stearic acid.

Mixing procedures were as follows: Ethylene/propylene/5-vinyl-2-norbornene copolymer rubber (A-4) was masticated for 15 sec, followed by addition of zinc white, stearic acid and softening agent, and finally 0.5 weight parts (1.0× $10^3$ mole) of bis-3-(triethoxysilyl)propyltetrasulfane [Degussa Huels AG., trade name: Si-69] roughly mixed with carbon black (in Comparative Examples 17–21, carbon black was charged alone without bis-3-(triethoxysilyl) propyltetrasulfane), and mixed for 4 min. Temperature of discharged compounds was 175° C.

The compound thus prepared was then wound around an open roll of 8 inch φ (surface temperatures of front and back rolls; 50° C., rotation speeds of front and back roll; 18 rpm and 15 rpm, respectively, roll clearance: 5 mm), and then added with sulfur and vulcanization accelerator and mixed for 5 min. A ribbon-like compound with 5 mm thickness and 40 mm width was sheeted out and fed to a vertical type injection machine to produce rubber vibration isolators.

Samples for measurement of activation energy were prepared similarly by the process described above except for excluding vulcanization agent and vulcanization accelerators in roll mixing.

Formulation of each composition is shown in Table 8 and mixing conditions and results are shown in Tables 9 and 10.

TABLE 8

|  | Example 13–17 | Comparative Example 17–21 |
|---|---|---|
| (Composition) |  |  |
| Copolymer Rubber (A-4) | 150 | 150 |
| Zinc Oxide No.1 | 5 | 5 |
| Stearic Acid | 1 | 1 |
| Asahi #60G | 60 | 60 |
| Si-69 | 0.5 | 0 |
| Sanceler BZ | 1.3 | 1.3 |
| Sanceler M | 0.7 | 0.7 |
| Sulfur | 0.75 | 0.75 |

Vulcanization system: Sulfur 0.75 weight part, vulcanization accelerator zinc di-n-butyldithiocarbamate [Sanshin Chem. Ind. Co., Ltd., trade name: SancelerBZ] 1.3weight part, vulcanization accelerator2-mercaptobenzothiazole [SanshinChem. Ind. Co., Ltd., trade name: Sanceler M] 0.7 weight part.

TABLE 9

|  | Example | | | | |
|---|---|---|---|---|---|
|  | 13 | 14 | 15 | 16 | 17 |
| (Mixing Conditions) |  |  |  |  |  |
| Discharge Temp. - Mixing Time |  |  |  |  |  |
| 150° C. - 4 minutes | ○ |  |  |  |  |
| 160° C. - 4 minutes |  | ○ |  |  |  |
| 170° C. - 4 minutes |  |  | ○ |  |  |
| 170° C. - 8 minutes |  |  |  | ○ |  |
| 175° C. - 15 minutes |  |  |  |  | ○ |
| Activation Energy ① (kJ/mol) | 80 | 80 | 80 | 80 | 80 |
| Activation Energy ② (kJ/mol) | 80 | 79 | 78 | 78 | 77 |
| Change Rate (%) | 0 | 1 | 3 | 3 | 4 |
| Ribbon Break Test | No | No | No | No | No |

TABLE 10

|  | Comparative Example | | | | |
|---|---|---|---|---|---|
|  | 17 | 18 | 19 | 20 | 21 |
| (Mixing Conditions) | | | | | |
| Discharge Temp. - Mixing Time | | | | | |
| 150° C. - 4 minutes | ○ | | | | |
| 160° C. - 4 minutes | | ○ | | | |
| 170° C. - 4 minutes | | | ○ | | |
| 170° C. - 8 minutes | | | | ○ | |
| 175° C. - 15 minutes | | | | | ○ |
| Activation Energy ① (kJ/mol) | 80 | 80 | 80 | 80 | 80 |
| Activation Energy ② (kJ/mol) | 38 | 30 | 18 | 10 | 7 |
| Change Rate (%) | 53 | 63 | 78 | 88 | 91 |
| Ribbon Break Test | Many Cracks | Break | Break | Break | Break |

EXAMPLES 18–20 AND COMPARATIVE EXAMPLES 22–24

A composition including the following components was mixed using 16 L Bumbury's mixer (made by Kobe Steel Ltd.) under charge ratio of 75%: 100 weight parts (as product weight, 150 weight parts) of ethylene/propylene/5-vinyl-2-norbornene copolymer rubber (A-4) [molar ratio of ethylene/propylene=68/32, intrinsic viscosity [η] in decalin at 135° C.=4.0 dl/g, iodine value=22, Mooney viscosity (after oil extension)=110, oil content=50 phr (parts per hundred rubber); product of Mitsui Chem. Corp.] or 100 weight parts (110 weight parts as product weight) of ethylene/propylene/5-vinyl-2-norbornene copolymer rubber (A-5) [molar ratio of ethylene/propylene molar ratio=68/32, intrinsic viscosity [η] in decalin at 135° C.=2.7 dl/g, iodine value=20, Mooney viscosity (after oil extension, ML(1+4) 100° C.)=90, oil content=10 phr [parts per hundred rubber); product of Mitsui Chem. Corp.], 60 weight parts of FEF carbon black [Asahi Carbon Co., Ltd. trade name: Asahi #60G], 40 weight parts of softening agent [Idemitsu Kosan Co., Ltd., trade name: Diana Process Oil PW-380] (only in Example 20), 5 weight parts of zinc white [Sakai Chem. Ind. Co., Ltd., trade name: No. 1] and 1 weight part of stearic acid.

Mixing procedures were as follows: Ethylene/propylene/5-vinyl-2-norbornene copolymer rubber (A-4) or ethylene/propylene/5-vinyl-2-norbornene copolymer rubber (A-5) was masticated for 15 sec, followed by addition of zinc white, stearic acid, and softening agent (only in Example 20), and finally carbon black roughly mixed with predetermined amount of bis-3-(triethoxysilyl)propyltetrasulfane [Degussa Huels AG., trade name: Si-69] (in Comparative Examples 23 and 24, dipentamethylenethiuram tetrasulfide (Sanshin Chem. Ind. Co., Ltd., trade name: Sanceler TRA) and 0.04 weight part of sulfur were roughly blended respectively, instead of bis-3-(triethoxysilyl) propyltetrasulfane) and mixed for 4 min. Temperature of discharged compounds was 170° C.

The compound thus prepared was then wound around an open roll of 8 inch φ (surface temperatures of front and back rolls; 50° C., rotation speeds of front and back roll; 18 rpm and 15 rpm, respectively, roll clearance; 5 mm) and then added with sulfur and vulcanization accelerator and mixed for 5 min. A ribbon-like compound with 5 mm thickness and 40 mm width was sheeted out and fed to a vertical type injection machine to produce rubber vibration isolators.

Samples for measurement of activation energy were prepared similarly by the process described above except for excluding vulcanization agent and vulcanization accelerators in roll mixing.

Formulation of each composition is shown in Table 11 and mixing conditions and results are shown in Table 12.

TABLE 11

|  | Example | | | Comparative Example | | |
|---|---|---|---|---|---|---|
|  | 18 | 19 | 20 | 22 | 23 | 24 |
| (Composition) | | | | | | |
| Copolymer Rubber (A-4) | 150 | 150 | | 150 | 150 | 150 |
| Copolymer Rubber (A-5) | | | 110 | | | |
| Zinc Oxide No.1 | 5 | 5 | 5 | 5 | 5 | 5 |
| Stearic Acid | 1 | 1 | 1 | 1 | 1 | 1 |
| Asahi #60G | 60 | 60 | 60 | 60 | 60 | 60 |
| PW-380 | | | 40 | | | |
| Sanceler TRA | | | | | 0.5 | |
| Sulfur | | | | | | 0.04 |
| Si-69 | 0.3 | 0.5 | 1.0 | 3.0 | 0 | 0 |
| Sanceler M | 0.7 | 0.7 | 0.7 | 0.7 | 0.7 | 0.7 |
| Sanceler BZ | 1.0 | 1.0 | 1.0 | 1.0 | 1.0 | 1.0 |
| Sanceler TT | 0.8 | 0.8 | 0.8 | 0.8 | 0.8 | 0.8 |
| Sulfur | 0.75 | 0.75 | 0.75 | 0.75 | 0.75 | 0.75 |

Vulcanization Accelerator

Zinc di-n-butyldithiocarbamate [product of Sanshin Chem. Ind. Co., Ltd., trade name: Sanceler BZ]

2-Mercaptobenzothiazole [productofSanshin Chem. Ind. Co., Ltd., trade name: Sanceler M]

Tetramethylthiuram disulfide [product of Sanshin Chem. Ind. Co., Ltd., trade name: Sanceler TT]

TABLE 12

|  | Example | | | Comparative Example | | |
|---|---|---|---|---|---|---|
|  | 18 | 19 | 20 | 22 | 23 | 24 |
| Activation Energy ① | 80 | 80 | 80 | 80 | 80 | 80 |
| Activation Energy ② | 79 | 79 | 80 | 80 | 15 | 10 |
| Change Rate (%) | 1 | 1 | 0 | 0 | 81 | 88 |
| (Physical Properties of Vulcanized Rubber[1]) | | | | | | |
| $M_{100}$ (MPa) | 3.2 | 3.1 | 3.0 | 2.9 | 4.2 | 4.3 |
| $M_{300}$ (MPa) | 11.8 | 11.2 | 10.8 | 10.1 | 11.8 | 11.7 |
| $T_B$ (MPa) | 21.5 | 21.9 | 22.5 | 22.5 | 12.5 | 12.8 |
| $E_B$ (%) | 760 | 770 | 780 | 790 | 420 | 410 |
| HA (Compression Set) | 60 | 60 | 60 | 59 | 61 | 61 |
| 120° C. × 22 h (%) | 41 | 42 | 43 | 62 | 60 | 61 |
| Dynamic Modulus (1 Hz) | | | | | | |
| $E^*$ (x10$^7$)Pa | 7.2 | 6.8 | 6.7 | 6.5 | 7.8 | 7.9 |
| tan δ (x10$^{-1}$) (10 Hz) | 0.12 | 0.10 | 0.10 | 0.10 | 0.13 | 0.13 |

TABLE 12-continued

|  | Example | | | Comparative Example | | |
| --- | --- | --- | --- | --- | --- | --- |
|  | 18 | 19 | 20 | 22 | 23 | 24 |
| E*(x10⁷)Pa | 8.5 | 8.3 | 8.2 | 8.0 | 9.5 | 9.7 |
| tan δ (x10⁻¹) | 0.14 | 0.13 | 0.13 | 0.13 | 0.17 | 0.17 |

¹Conditions: 170° C. × 10 min., 12 min. for CS

EXAMPLES 21 AND COMPARATIVE EXAMPLES 25–27

Weatherstrip Sponge Product

A composition including the following components was mixed by 16 L Bumbury's mixer (made by Kobe Steel Ltd.) under charge ratio of 75% for 6 min: 100 weight parts of ethylene/propylene/5-vinyl-2-norbornene copolymer rubber (A-6) [molar ratio of ethylene propylene=68/32, intrinsic viscosity [η] in decalin at 135° C.=2.1 dl/g, iodine value=25, Mooney viscosity (ML(1+4) 125° C.)=30; product of Mitsui Chem. Corp.], 5 weight parts of activated zinc white [Inoue Sekkai Kogyo K.K., trade name: MetaZ102], 2 weight part of stearic acid , 100 weight parts of SRF-H carbon black [Asahi Carbon Co., Ltd., trade name: Asahi #50HG], pre-determined amount of bis-3-(triethoxysilyl)propyltetrasulfane [Degussa Huels AG., trade name: Si-69] or other organosilane and 40 weight parts of paraffinic process oil [Idemitsu Kosan Co., Ltd., trade name: Diana Process Oil PW-380]. Simultaneous mixing method for whole components was adopted. Predetermined amount of bis-3-(triethoxysilyl)propyltetrasulfane and other organosilane were sprayed on the surface of weighed carbon black and charged into the mixer together with carbon black.

The compound thus prepared was then wound around an open roll of 8 inch φ surface temperatures of front and back rolls; 50° C., rotation speeds of front and back roll; 18 rpm and 15 rpm, respectively], and then added with sulfur, vulcanization accelerator, defoaming agent (calcium oxide; Inoue Sekkai Kogyo K.K., trade name: Vesta 20), foaming agent [azodicarbonamide, Eiwa Chem. Ind. Co., Ltd., trade name: Vinyhole AC#3] and co-foaming agent [urea based type; Eiwa Chem. Ind. Co., Ltd., trade name:

Cellpaste 101] and mixed for 5 min. A ribbon-like compound with 10 mm thickness and 70 mm width was sheeted out.

Figure 4A:
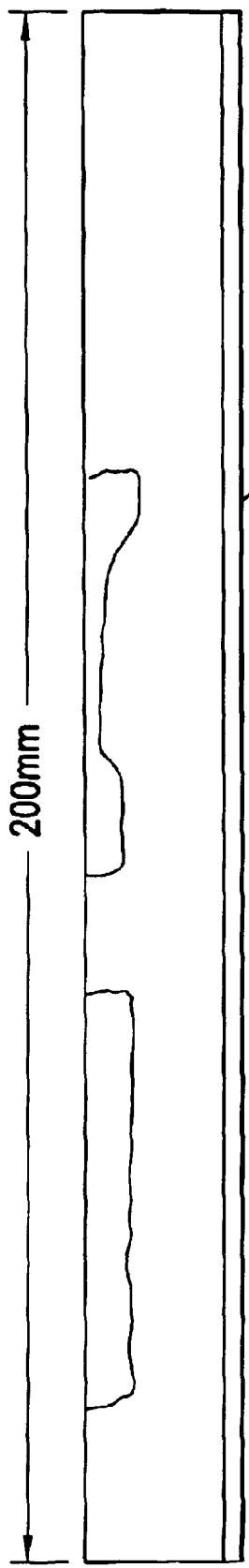
FIG. 4A shows a front view of tubular sponge manufactured in Examples and FIG. 4B shows its cross sectional view.
Figure 4B:
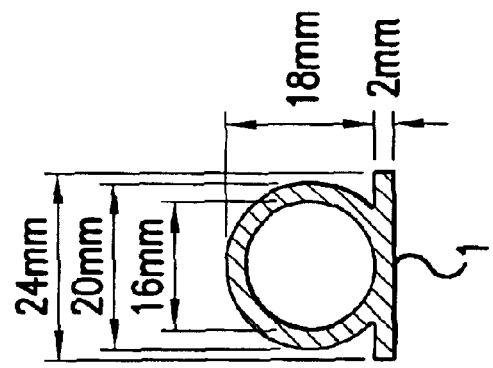

The ribbon-like compound described above was then charged to a tubular mold of a transfer molding machine in 10 sec, followed by vulcanization and foaming at 180° C. for 3.5 min. to get a foamed molded body (sponge rubber) shown in FIG. 4. Various tests for physical properties were carried out on the vulcanized and foamed rubber molded body.

Formulation of each composition, mixing conditions and results are shown in Tables 13.

EXAMPLES 22

Weatherstrip Sponge Product

A composition consisting of the following components was premixed in advance using 4.3 L Bumbury's mixer at 175° C. for 5 min: 100 weight parts of ethylene/propylene/5-vinyl-2-norbornene copolymer rubber (A-6) (molar ratio of ethylene/propylene=68/32, intrinsic viscosity [η] in decalin at 135° C.=2.1 dl/g, iodine value=25, Mooney viscosity (ML(1+4) at 125° C.)=30; product of Mitsui Chem. Corp.] and 20 weight parts of propylene homopolymer (melting temperature: 160° C., MFR (190° C., 2.16 kg load in accordance with ASTM D1238): 20 g/10 min and crystallinity: 85%). Thus mixed compound was extruded using 50 mm extruder at 260° C. (in nitrogen sealing), followed by cooling in water to get EPDM/PP alloy. Similar procedures to Example 21 were repeated using the alloy and ingredients shown in Table 13. Results are shown in Table 13.

TABLE 13

|  | Example | | Comparative Example | | |
| --- | --- | --- | --- | --- | --- |
|  | 21 | 22 | 25 | 26 | 27 |
| Copolymer Rubber (A-6) | 100 |  | 100 | 100 | 100 |
| EPDM/PP Alloy |  | 120 |  |  |  |
| Activated Zinc Oxide | 5 | 5 | 5 | 5 | 5 |
| Stearic Acid | 2 | 2 | 2 | 2 | 2 |
| Asahi 50HG | 100 | 80 | 100 | 100 | 100 |
| PW-380 | 40 | 40 | 40 | 40 | 40 |
| Si-69 | 0.5 | 0.01 |  |  |  |
| Organosilane 1 |  |  | 0.3 |  |  |
| Organosilane 2 |  |  |  | 0.3 |  |
| Organosilane 3 |  |  |  |  | 0.3 |
| Foaming Agent | 7 | 7 | 7 | 7 | 7 |
| Urea-based Co-foaming agent | 2 | 2 | 2 | 2 | 2 |
| Activation Energy ① | 95 | 95 | 95 | 95 | 95 |
| Activation Energy ② | 94 | 94 | 43 | 34 | 23 |
| Change Rate (%) | 1 | 1 | 55 | 64 | 76 |
| Temperature after Mixing and Discharge (° C.) | 120 | 123 | 135 | 135 | 135 |
| Physical Properties of Sponge |  |  |  |  |  |
| Specific Gravity (kg/cm³) | 540 | 550 | 560 | 565 | 570 |
| $T_B$ (MPa) | 2.5 | 2.3 | 2.6 | 2.5 | 2.4 |
| $E_B$ (%) | 290 | 280 | 200 | 210 | 190 |
| Compression Set (%) | 30 | 32 | 43 | 45 | 47 |
| Fluidity (mm) | 170 | 145 | 110 | 100 | 90 |
| Surface Texture of Product | 5 | 5 | 2 | 2 | 2 |

Vulcanization system: Sulfur 1.0 weight part, vulcanization accelerator 2-mercaptobenzothiazole [Sanshin Chem. Ind. Co., Ltd., trade name: Sanceler M] 0.5 weight part, vulcanization accelerator tetramethylthiuramdisulfide [SanshinChem. Ind. Co., Ltd., trade name: Sanceler TT] 0.5 weight part, vulcanization accelerator zinc di-n-butyldithiocarbamate [Sanshin Chem. Ind. Co., Ltd., trade name: Sanceler BZ] 1.5 weight part and tetraethylthiuramdisulfide [Sanshin Chem. Ind. Co., Ltd., trade name: Sanceler TET] 0.5 weight part.

Organosilane 1: Dimethoxymethylphenylsilane ($SiC_9H_{14}O_2$) (Shin-Etsu Chem. Co., Ltd.)

Organosilane 2: Tetrakis(2-methoxyethoxy)silane (($CH_3OCH_2CH_2O)_4Si$) (Shin-Etsu Chem. Co., Ltd.)

Organosilane 3: Vinyltris(β-methoxyethoxy)silane (($CH_3OCH_2CH_2O)_3SiCH=CR_2$) (Shin-Etsu Chem. Co., Ltd.)

All the publications, patents and patent applications cited herein are incorporated herein by reference in their entirety.

INDUSTRIAL APPLICABILITY

The invention provides a rubber composition for extrusion giving an extrudate having no crack nor breakage and stable cross sectional shape in ribbon-like compound prepared prior to extrusion, along with foam products having little foaming variation. This contributes to provide extrudate products such as weatherstrip sponge, high extension foam seal, glass run channel, window frame and water hose for automobile, which have superior surface texture and stable quality irrespective to season or type of mixing machine. The invention eliminates most of inferior products which have been recognized to be caused by unknown foreign matter until now.

A rubber composition for molding of the invention provides a compound prepared for injection which has superior fluidity in a mold and no breakage phenomenon, along with stable and uniform foaming characteristics in molded sponge. Furthermore, a rubber composition for molding of the invention provides rubber vibration isolator, cast sponge, grommet, O-ring, packing, boots, window frame, break piston cup and OA roll products with good surface texture and superior mechanical strength.

What is claimed is:

1. A rubber composition for extrusion comprising 100 weight parts of ethylene/α-olefin/non-conjugated polyene copolymer rubber (A) composed of ethylene, α-olefin having carbon atoms of 3–20 and non-conjugated polyene, and at least 30–300 weight parts of carbon black (B) and $1.0 \times 10^{-5}$–$5.0 \times 10^{-3}$ mol of alkoxysilane compound (C) per 100 g of the ethylene/α-olefin/non-conjugated polyene copolymer rubber (A), the alkoxysilane compound (C) being shown by the following formula (I):

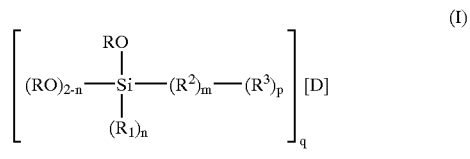

wherein, R is an alkyl group having carbon atoms of 1–4 or an alkoxy group having carbon atoms of 1–4, $R^1$ is an alkyl group having carbon atoms of 1–4 or phenyl group, n is 0, 1 or 2, $R^2$ is a bivalence of linear or branched hydrocarbon group having carbon atoms of 1–6, $R^3$ is an arylene group having carbon atoms of 6–12, m and p are 0 or 1 respectively, and m and p are not 0 at a same time, q is 1 or 2, D is —SCN or —SH when q is 1, and —Sx— when q is 2 (wherein x is an integer of 2–8).

2. The rubber composition for extrusion according to claim 1, wherein the ethylene/α-olefin/non-conjugated polyene copolymer rubber (A) (i) comprises a unit (a) derived from ethylene and a unit (b) derived from α-olefin having carbon atoms of 3–20 in a [(a)/(b)] molar ratio of 50/50–90/10, (ii) has an iodine value of 1–40, and (iii) has an intrinsic viscosity [η] measured in decalin at 135° C. of 2.0–4.5 dl/g.

3. The rubber composition for extrusion according to claim 1, wherein an amount of the carbon black (B) is 50–200 weight parts to 100 weight parts of the ethylene/α-olefin/non-conjugated polyene copolymer rubber (A).

4. The rubber composition for extrusion according to claim 1, wherein an amount of the carbon black (B) is 61–200 weight parts to 100 weight parts of the ethylene/α-olefin/non-conjugated polyene copolymer rubber (A).

5. The rubber composition for extrusion according to claim 1, wherein an amount of the carbon black (B) is 70–200 weight parts to 100 weight parts of the ethylene/α-olefin/non-conjugated polyene copolymer rubber (A).

6. The rubber composition for extrusion according to any one of claims 1–5, wherein its apparent activation energy is 20–300 kJ/mol, and a change rate of the apparent activation energy is not higher than 40% even after processing in any rubber processing process.

7. The rubber composition for extrusion according to claim 1, wherein said composition does not show any ribbon break nor ribbon crack, and has a change rate in die swell ratio not higher than 5% due to a rise of viscosity in an extruder.

8. The rubber composition for extrusion according to claim 3, wherein said composition does not show any ribbon break nor ribbon crack, and has a change rate in die swell ratio not higher than 5% due to a rise of viscosity in an extruder.

9. A weather strip sponge product, highly expanded seal product, glass run channel product, window frame product or water hose product for automobile characterized by comprising the rubber composition according to claim 1.

10. A process for manufacturing a vulcanized rubber molding product comprising molding the rubber composition according to claim 1 to an intended shape using an extruder and vulcanizing it.

11. A rubber composition for molding comprising 100 weight parts of an ethylene/α-olefin/non-conjugated polyene copolymer rubber (A) composed of ethylene, α-olefin having carbon atoms of 3–20 and non-conjugated polyene, and at least 30–300 weight parts of carbon black (B) and $1.0 \times 10^{-5}$–$5.0 \times 10^{-3}$ mol of alkoxysilane compound (C) per 100 g of the ethylene/α-olefin/non-conjugated polyene copolymer rubber (A), the alkoxysilane compound (C) being shown by the following formula (I):

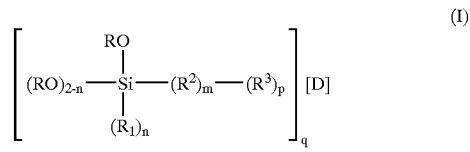

wherein, R is an alkyl group having carbon atoms of 1–4 or an alkoxy group having carbon atoms of 1–4, $R^1$ is an alkyl group having carbon atoms of 1–4 or phenyl group, n is 0, 1 or 2, $R^2$ is a bivalence of linear or branched hydrocarbon group having carbon atoms of 1–6, $R^3$ is an arylene group having carbon atoms of 6–12, m and p are 0 or 1 respectively, and m and p are not 0 at a same time, q is 1 or 2, D is —SCN or —SH when q is 1, and —Sx— when q is 2 (wherein x is an integer of 2–8).

12. The rubber composition for molding according to claim 11, wherein the ethylene/α-olefin/non-conjugated polyene copolymer rubber (A) (i) comprises a unit (a) derived from ethylene and a unit (b) derived from α-olefin having carbon atoms of 3–20 in a [(a)/(b)] molar ratio of 50/50–90/10, (ii) has an iodine value of 1–40, and (iii) has an intrinsic viscosity [η] measured in decalin at 135° C. of 0.8–4.5 dl/g.

13. The rubber composition for molding according to claim 11, wherein an amount of the carbon black (B) is 50–200 weight parts to 100 weight parts of the ethylene/α-olefin/non-conjugated polyene copolymer rubber (A).

14. The rubber composition for molding according to claim 11, wherein an amount of the carbon black (B) is 61–200 weight parts to 100 weight parts of the ethylene/α-olefin/non-conjugated polyene copolymer rubber (A).

15. The rubber composition for molding according to claim 11, wherein an amount of the carbon black (B) is 80–200 weight parts to 100 weight parts of the ethylene/α-olefin/non-conjugated polyene copolymer rubber (A).

16. The rubber composition for molding according to any one of claims 11–15, wherein its apparent activation energy is 20–200 kJ/mol, and a change rate of the apparent activation energy is not higher than 20% even after processing in any rubber processing process.

17. The rubber composition for molding according to claim 11, wherein, the composition does not break in a ribbon preformed prior to injection and has a good fluidity in mold which does not vary, and physical properties of the composition after vulcanization do not vary depending on mixing conditions in a preparation of the compound.

18. A rubber vibration insulator, cast sponge, grommet, O-ring, packing, boots, window frame, break piston cup or OA roll product characterized by comprising the rubber composition according to claim 11.

19. A process for manufacturing a vulcanized rubber molding product comprising forming the rubber composition according to claim 11 to a shape suitable to a molding machine and then vulcanizing it.

* * * * *